Figure 1:
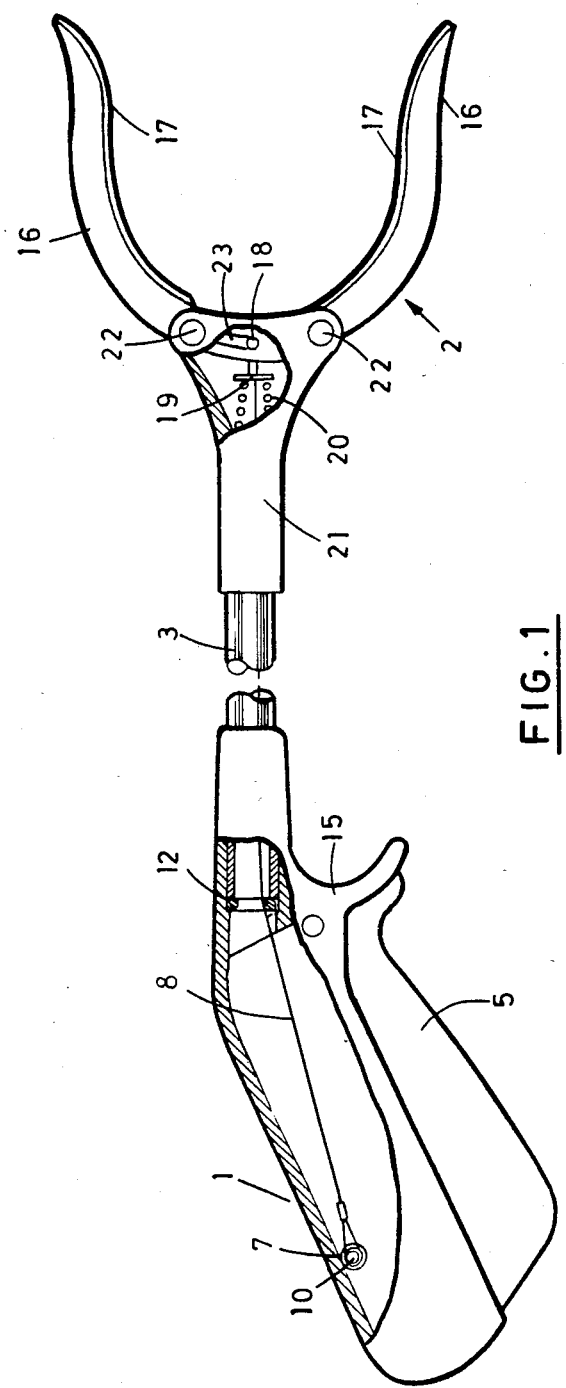

United States Patent [19]

Bergkvist et al.

[11] Patent Number: 4,647,094
[45] Date of Patent: Mar. 3, 1987

[54] ARRANGEMENT REGARDING A GRIPPING DEVICE

[75] Inventors: Håkan Bergkvist, Bromma; Sven-Eric Juhlin, Ingaro; Maria Benktzon, Sollentuna, all of Sweden

[73] Assignee: RFSU:S Forsaljningsorghnisation AB, Stockholm, Sweden

[21] Appl. No.: 837,034

[22] Filed: Mar. 6, 1986

[30] Foreign Application Priority Data

Mar. 7, 1985 [SE] Sweden ............................ 8501121

[51] Int. Cl.[4] ................................................ B25J 1/04
[52] U.S. Cl. ..................................... 294/3; 294/19.1; 294/65.5
[58] Field of Search ............... 294/2, 3, 11, 19.1, 294/22-24, 65.5, 103.1, 104, 100, 115, 116

[56] References Cited

U.S. PATENT DOCUMENTS

| 316,524 | 4/1885 | Colby et al. | 294/23 |
| 1,572,426 | 2/1926 | Foote | 294/19.1 X |
| 1,672,477 | 6/1928 | Tipsord et al. | 294/19.1 |
| 2,869,914 | 1/1959 | Yoakley | 294/22 |
| 3,146,015 | 8/1964 | Roberge | 294/19.1 |
| 3,228,720 | 1/1966 | Jordan | 294/65.5 |
| 3,591,226 | 7/1971 | Elmore et al. | 294/19.1 |

FOREIGN PATENT DOCUMENTS 739209 10/1955 United Kingdom ............... 294/19.1

Primary Examiner—Johnny D. Cherry
Attorney, Agent, or Firm—Witherspoon & Hargest.

[57] ABSTRACT

The present invention concerns a gripping device provided with gripping claws (16) at one end of a tube (3), and at the other end of the tube (3), an operating handle (1). This handle (1) includes a trigger key (5) which is pivotable in the handle. During this pressing the key actuates a push rod (6), one end of which being pivotably mounted in the trigger key (5) and the other end of which being displaceably arranged in the upper portion of the operating handle (1).

11 Claims, 2 Drawing Figures

ARRANGEMENT REGARDING A GRIPPING DEVICE

The present invention concerns an arrangement for gripping devices, which are preferably intended to be used by disabled persons.

Elderly people with impaired mobility and persons with different kinds of handicaps, are in a great need of different kinds of gripping assistance. Many situations in every day life do not bring about any problems to healthy people, but for the disabled, such situations may create insurmountable difficulties. In practice, for example, it can be impossible for a wheelchair-bound person to pick up an object that he or she has dropped on the floor. Even for non wheelchair-bound persons with another type of physical handicap it can be very difficult to bend down to pick up a dropped object or to reach a remote item.

To make it easier for the disabled in such a situation, there are specially designed gripping devices available.

Previously known gripping devices of the above mentioned kind comprise a tube or a bar, at one end of which there is provided a gripping claw and at the other end a trigger. The transmission of force between handle and gripping claw is actuated by means of a relatively complicated mechanism of lever arms and a draw bar and push bar running parallel to or inside of the tube or bar. Furthermore, this type of force transmitting mechanism is generally such that the gripping width of the handle becomes relatively big, that is, the handle is thick and heavy. This is a drawback since it often happens that persons who are in need of a gripping device of this kind, lack the ability to open their hand to a sufficient degree to be able to grasp the maneuver handle so as to get a real hold thereof.

The objective of the present invention is the eliminate those drawbacks that are associated with the gripping devices according to the prior art technique, and to offer a construction of the force transmitting mechanism that is simpler, and thus cheaper, to manufacture, and that at the same time provides a small grasping width.

This objective of the gripping device according to the invention is achieved by a push rod, which is provided in the operating handle and displaceably arranged against the inside of the upper portion of the operating handle, transmitting the force from a trigger key to a cable provided in the tool tube in such a way, that a displacement of the push rod is achieved, whereby, when the trigger key is being pressed into the handle, there is initially required a very little movement of the trigger key so as to obtain a big gripping movement with the gripping claws. The design of this force transmitting mechanism additionally requires little space, which results in a smaller grasping width of the operating handle.

Figure 2:
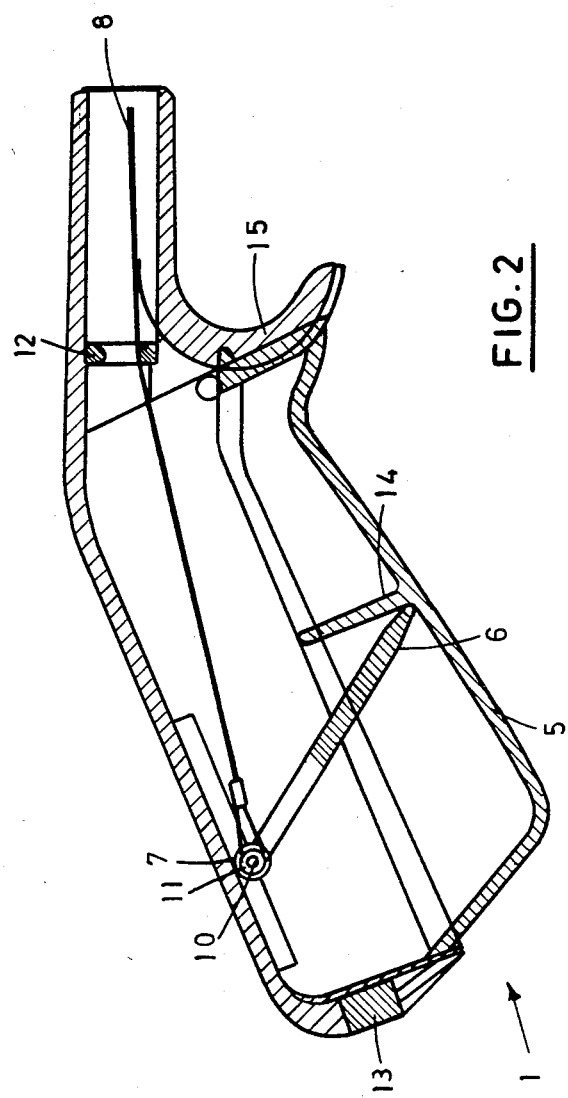

In the following an example of embodiment of the gripping device according to the invention will be described further below with reference to the accompanying drawings, in which FIG. 1 shows a side view of the gripping device according to the invention with some parts as well as major portions of the tube cut away, and FIG. 2 shows a cross section through the operating handle.

The embodiment of the invention shown in FIG. 1 comprises an operating handle 1, a tube 3 and a gripping unit 2. The unit 2 comprises two gripping claws 16 pivotable about a respective axle 22, each axle being arranged in a claw sleeve 21 at a distance from the central line of the tube and on opposite sides of the tube. The claw portions projecting inwardly towards the tube are provided with grooves 23 and overlap each other so that a pulling peg 18 can run in both grooves in a way that is described below. The insides of the gripping claw are provided with a rubber lining 17. Inside of the tube a cable runs by means of which a force from the trigger key 5 is transmitted to the gripping unit 2. The cable is attached to a disc plate 19 through a pin extending longitudinally relative to the tube. The disc plate in turn is attached to the above pulling peg 18, which is transverse relative to the tube. The pulling peg 18 runs in the grooves 23 of the gripping claws 16. The disc plate 19 is affected by a spring 20, so that the gripping claws 16, when being brought together to form a grip, urge to spring back to an open position as shown in FIG. 1.

The gripping movement is achieved by the user grasping the operating handle 1 and pressing the trigger key 5 which is provided in the handle 1. In the handle 1, there is at one of its ends a wedge-shaped push rod 6, which is provided so that it with said end, rests in a corner formed by the inner wall of the trigger key 5 and by a support flange 14 projecting from said wall (FIG. 2). At the other end of the push rod 6 there is a lower friction roller 7 mounted on an axle 10 through a bushing 11 so that the roller 7 readily runs along the inside of operating handle 1. It is also conceivable that the other end of the push rod 6 may slide along the inside of the operating handle, in a groove.

In the example of the embodiment shown in the Figure the push rod 6 is inclined longitudinally relative to the device, so that the wedge-shaped end is closer to the gripping claws 16 than the end provided with the roller. The cable 8 running from disc plate 19 and through tube 3 rests at the exit of tube 3 in the inside of operating handle against a ring 12, through which the cable 8 runs and which consists of a material of low friction so as to reduce the wear of the cable. Alternatively, the cable 8 can be provided with a coat of a material that provides low friction. The cable 8 is provided with a loop arranged around the axle 10 of the push rod 6. Through this arrangement described and shown in FIG. 2 of the inclined push rod 6 and cable 8 a longitudinal displacement is attained of the push rod 6. More exactly, this means that a small initial movement of the trigger key 5, and thus a displacement of the pivot point of the push rod 6, said displacement being substantially perpendicular to the longitudinal direction of the device, renders a relatively larger displacement in the longitudinal direction of the device, of the roller-provided end of the push rod 6. The pushing force is transmitted over the cable 8 to the gripping claws 16, which, therefore, are brought together relatively quickly to begin with, and then more slowly. This makes a user "stronger", the more he or she presses the trigger.

In order to get a comfortable grip, the operating handle 1 is slightly angled relative to the tube 3, thus rendering less stress on the wrist. Furthermore, the handle 1 is provided with a finger rest 15, thus making the design of the handle similar to a piston grip. At the end of the handle there is attached a permanent magnet 13, by which magnetic objects can be retrieved from, for example, a floor. The gripping claws 16 are provided with a lining 17 of an elastic material, such as rubber. In order to reduce the weight of the device, the tube is made of some light material, preferably aluminum, but it can also be composed of plastics or a steel alloy, allowing a thin-walled tubing. The components of the handle can be made of plastics, wood or light metal or of any other light and durable material.

With the gripping device and its mechanism of force transmission according to the invention, an operating handle is achieved with a considerably smaller grasping width, which is of great advantage to people having difficulties in fully opening their hand in order to grasp an object.

In addition, the simple constructions make it possible to manufacture the device at a significantly lower cost than it has been possible up to now.

The push rod 6 is shown inclined in one direction but it can of course be inclined in the opposite direction. In such a case, the cable will run through a loop or equivalent at the rear end of the handle 1, and then to the push rod 6. Such a construction stays within the frame of the invention, and is as such defined in the appended claims, as other modifications of the invention which are obvious to a person skilled in the art.

We claim:

1. A gripping device comprising an operating handle and a trigger key pivoted to said handle, said handle and said trigger key each having an inner wall, a support flange projecting from said inner wall of said trigger key towards said inner wall of said handle, a push rod extending towards said inner wall of said handle from a corner formed by said inner wall of said trigger key and said support flange and slidable upon said support flange, the end of said push rod extending towards said inner wall of said handle engaging said inner wall of said handle, a tube having one end attached to said handle, a claw sleeve attached to another end of said tube, said claw sleeve having a first and second axle coupled thereto, said first and second axles being positioned a distance from the longitudinal axis of said tube and on opposite sides of said tube, a first gripping claw having a first gripping end and an opposite end having a first groove therein, said first gripping claw being pivotally connected to said claw sleeve at said first axle at a position on said first gripping claw located between said first gripping end and said first groove, a second gripping claw having a second gripping end and an opposite end having a second groove therein, said second groove overlapping said first groove, said second gripping claw being pivotally connected to said claw sleeve at said second axle at a position on said second gripping claw located between said second gripping end and said second groove, a pulling peg extending transverse relative to said longitudinal axis from said first groove to said second groove, a disc plate attached to said pulling peg, spring means contained within said claw sleeve and bearing against said disc plate for urging said gripping claws towards an open position, and a cable extending through said tube and having one end coupled to said push rod and an opposite end attached to said disc plate.

2. An arrangement according to claim 1, characterized in that the push rod (6) is provided with a low friction roller (7) running along the inner wall of the operating handle (1).

3. An arrangement according to claim 2, characterized in that the push rod (6) extends from the corner in the trigger key (5) forming an angle smaller than 90° relative to the inside of the upper portion of the operating handle (1).

4. An arrangement according to claim 2, characterized in that the push rod (6) is wedge-shaped at one end, this end resting in the corner formed by the inner wall of trigger key (5) and by the support flange (14) projecting from said wall.

5. An arrangement according to claim 1, characterized in that one end of the push rod (6) slides in a groove along the inside of the operating handle (1).

6. An arrangement according to claim 5, characterized in that the push rod (6) extends from the corner in the trigger key (5) forming an angle smaller then 90° relative to the inside of the upper portion of the operating handle (1).

7. An arrangement according to claim 5, characterized in that the push rod (6) is wedge-shaped at one end, this end resting in the corner formed by the inner wall of trigger key (5) and by the support flange (14) projecting from said wall.

8. An arrangement according to claim 1 characterized in that the push rod (6) extends from the corner in the trigger key (5) forming an angle smaller than 90° relative to the inside of the upper portion of the operating handle (1).

9. An arrangement according claim 8, characterized in that the push rod (6) is wedge-shaped at one end, this end resting in the corner formed by the inner wall of trigger key (5) and by the support flange (14) projecting from said wall.

10. An arrangement according to claim 1 characterized in that the push rod (6) is wedge-shaped at one end, this end resting in the corner formed by the inner wall of trigger key (5) and by the support flange (14) projecting from said wall.

11. An arrangement according to claim 1 characterized in that there is provided a permanent magnet (13) in the upper portion of the operating handle (1), which magnet (13) is intended to be used for picking up magnetic objects.

* * * * *